United States Patent [19]

Seitzer

[11] 4,201,761

[45] May 6, 1980

[54] PROCESS FOR MAKING IRON OXIDE OF CONTROLLED PARTICLE SIZE

[75] Inventor: Walter H. Seitzer, West Chester, Pa.

[73] Assignee: Suntech, Inc., Philadelphia, Pa.

[21] Appl. No.: 918,215

[22] Filed: Jun. 23, 1978

Related U.S. Application Data

[63] Continuation-in-part of Ser. No. 802,597, Jun. 2, 1977, abandoned.

[51] Int. Cl.² ............................................. C01G 49/02
[52] U.S. Cl. ...................................... 423/633; 423/634
[58] Field of Search ........................ 423/632, 633, 634

[56] References Cited

U.S. PATENT DOCUMENTS 3,082,067  3/1963  Hund .................................... 423/634
3,931,025  1/1976  Woditsch et al. ..................... 423/634

FOREIGN PATENT DOCUMENTS 43-15287  6/1968  Japan ....................................... 423/633

Primary Examiner—Delbert E. Gantz
Assistant Examiner—Wayne A. Langel
Attorney, Agent, or Firm—J. Edward Hess; Donald R. Johnson; Paul Lipsitz

[57] ABSTRACT

A process for preparing iron oxide with a controlled purity and large particle size which comprises oxidizing at a constant pH a vigorously agitated aqueous suspension of iron oxide crystals while continuously, but slowly adding a water soluble iron solution and continuously withdrawing a portion of the aqueous solution containing large size iron oxide crystals as product.

3 Claims, No Drawings

PROCESS FOR MAKING IRON OXIDE OF CONTROLLED PARTICLE SIZE

This application is a continuation-in-part of Ser. No. 802,597 filed June 2, 1977, and now abandoned.

It is known in the art to make magnetic iron oxide by oxidizing either iron or ferrous salts under specific conditions to give a particular crystal of hydrated ferric oxide (FeOOH) generally goethite ($\alpha$) or lepidocrocite ($\gamma$). These products are then carefully reduced to the magnetic $\gamma$-$Fe_2O_3$ so as to maintain most of the original crystal structure. This structure determines those magnetic properties (remanence and coercivity) which are important for making good magnetic tapes.

The size of the crystals is also very important in order that the magnetic oxides have optimum magnetic properties. It has been reported (U.S. Pat. No. 3,943,773) that small goethite crystals are desirable for good magnetic properties and crystals of 1 micron size are said to be too large for yielding magnetic oxide crystals having good properties. While magnetic iron oxides having a crystal size of up to one micron are sold commercially for inexpensive audio tapes, higher quality recording tapes employ magnetic iron oxides with a crystal size of from about two to four microns. It would be desirable to be able to economically obtain magnetic iron oxides having large crystal sizes, but no magnetic iron oxides are commercially available when crystal sizes above about four microns.

It has been disclosed in U.S. Pat. No. 3,288,563 that in an oxidation system where a ferrous compound is oxidized in a strongly alkaline medium, the addition of a large, fresh supply of ferrous compound to the reaction mass after a major part of the ferrous compound is already oxidized "favorably affects the particle size of the ferric oxide hydrate obtained with respect to its suitability as a starting material for the production of $\gamma$-$Fe_2O_3$ as a sound carrier for magnetic recording purposes". It is not indicated if the particle size is increased or decreased by such a procedure.

It has now been found that magnetic iron oxides may be prepared in a manner which enables particle size of the crystals to be controlled to give large size particles and it is possible to produce product crystals which have a particle size of from about one to about twenty microns in length. The process of the invention is also advantageous in that the crystals produced have a higher purity than those obtained by alternate methods.

In accord with the invention hydrated ferric oxides of large crystal size, useful for conversion to magnetic iron oxides, are obtained by continuously adding an oxygen-containing gas to a vigorously agitated suspension of ferric oxide at a pH of from about 5.0 to about 8.5 while continuously adding an aqueous solution of a ferrous salt at a rate which maintains the concentration of iron ions in the solution sufficiently low that no new crystals of ferric oxide form and continuously withdrawing an aqueous suspension of large size hydrated ferric oxide crystals. Room temperature is preferred for the process, but temperatures up to about 75° C. may be used.

The water soluble iron salt useful in the process will be a ferrous salt such as ferrous chloride, ferrous sulfate, ferrous acetate and the like. The aqueous solution of iron salt is introduced to a suitable vessel such as a baffled stirred reactor and provision is made to automatically add additional ferrous salt solution and, if needed, to maintain the pH an aqueous alkali metal solution (preferably NaOH). As indicated, the pH used will generally be between about 5.0 and about 8.5 and will depend upon the iron source as determined empircially. For example, with ferrous chloride a pH of about 6.5 will be used and with ferrous sulfate the pH should be about 5.5. The pH employed will be held essentially constant by the addition of an aqueous caustic solution during the process. As the aquous medium is stirred rapidly, oxygen in the form of an air stream or an oxygen-air stream is introduced into the aqueous system in large excess over that actually required to maintain the oxidation of the iron to the hydrated ferric oxide. The vessel is also provided with an overflow or pumping means to remove a portion of the aqueous medium containing the hydrated oxide.

An alternative technique involves using a batch system instead of the preferred continuous method outlined above. In a batch method, the only significant difference is that the large crystals are not continuously removed, but simply separated after addition of the ferrous salt (and caustic) has been terminated.

The process of the invention yields hydrated ferric oxide crystals of up to about 20 microns in length. The crystals are rod or needle shaped with a width of about one-tenth their length. The product crystals are of high purity and after reduction by hydrogen at about 350° C. and reoxidation in air at about 150° C., $\gamma$-$Fe_2O_3$ crystals of large size are obtained which are of excellent quality for use in audio tape manufacture.

It is not known why the crystals grow so large in the system of the invention, but it is believed that by this method of operation the average iron concentration is kept at such a low level that it is difficult for new crystals to form and easier for newly added iron to become part of the already growing crystals in the system. Thus, the crystals that are present grow to a large size. The low level iron concentration (e.g. ferrous ion) will generally be below about 200 mgm per liter, usually from about 0.3 to about 15 mgm/l.

EXAMPLE

The reactor is a 1-liter glass resin kettle having a bottom opening and being equipped with a baffle and high speed stirrer. The reaction volume is held at about 500 ml. and the iron solution is metered in by a bellows pump while the pH is maintained constant automatically with 2.5 M NaOH. Product is removed through a solenoid valve operated by a timer which opens the valve every minute or so, depending on valve and rate of removal. Cuts are taken every hour and 50 gram aliquots are filtered. The filtrate is analyzed for dissolved iron and, after drying, the solids are subjected to X-ray diffraction and electron microscopy.

In making the various runs, the iron salt is first oxidized without withdrawal to obtain small seed crystals in the systems. Thus, for example, a 0.3 M $FeCl_2$ solution is air blown at pH 6.5 for about 1 hour. In the case of $FeSO_4$, a 0.2 M $FeSO_4$ solution is air blown at pH 5.5 for about 2 hours. This procedure provides a system containing seed crystals and then continuous feed and withdrawal is started. For overnight shutdown on extra 50 ml of charge is added and the reactor stopped. Next morning at the start, 50 ml of product is withdrawn and analyzed.

Experiments were run in accord with the above procedure and the data obtained is given in the following table:

| Ex. No. | Cut No. | Charge ml Fe++ | ml NaOH | Fe ion mgm/lit | X-Ray(Counts/min) α-FeOOH | γ-FeOOH | Crystal Size (Microns) |
|---|---|---|---|---|---|---|---|
| 1 | 0.2M FeCl₂ at pH 6.5 | | | | | | |
| | 1 | 520 | 80 | 2.6 | | 356 | 0.4 × .08 |
| | 2 | 380 | 74 | 0.3 | | 370 | 0.8 × 0.1 |
| | Overnight. Increase concentration to 0.4 N FeCl₂. | | | | | | |
| | 2A | 70 | 17 | 0.3 | | 422 | 0.8 × 0.1 |
| | 3 | 370 | 124 | 0.3 | | 406 | 1.0 × 0.1 |
| | 4 | 360 | 124 | 0.3 | | 558 | 2.0 × 0.15 |
| | 5 | 345 | 125 | 0.4 | | 596 | 2.0 × 0.1 |
| | 6 | 375 | 133 | 0.5 | | 684 | 3.0 × 0.2 |
| | 7 | 340 | 118 | 0.5 | | 723 | Large |
| | 8 | 340 | 130 | 0.8 | | 756 | Large |
| | 9 | Overnight. | | 0.4 | 12 | 734 | Large |
| 2 | 0.2M FeSO₄ at pH 5.5 | | | | | | |
| | 1 | 360 | 56 | 185.0 | 75 | 434 | 1.5 × 0.1 |
| | 2 | 350 | 59 | 13.6 | 90 | 417 | 10.0 × 0.1 |
| | 3 | 275 | 50 | 9.8 | 132 | 445 | 25.0 × 0.1 |
| | Overnight. Change to faster stirrer | | | | | | |
| | 3A | | | 3.3 | 156 | 517 | 25 |
| | 4 | 320 | 47 | .9 | 164 | 478 | Large |
| | 5 | 325 | 50 | .4 | 196 | 448 | Large |
| | 6 | 275 | 50 | 1.4 | 234 | 417 | Large |
| | 7 | | 48 | .8 | 203 | 307 | Large |
| 3 | 1:1 FeSO₄:NaOH. Then oxidize at pH 5.5 for 125 min. at R.T. Then heat to 55° C. 0.2M FeSO₄ | | | | | | |
| | 1 | 340 | 60 | 300 | 222 | 250 | .05 × .5 |
| | 2 | 325 | 55 | 4.5 | 198 | 289 | |
| | Overnight at 55° C. | | | | | | |
| | 2A | | | 57.5 | 225 | 400 | |
| | 3 | 320 | 56 | .4 | 217 | 484 | |
| | 4 | 330 | 60 | .3 | 296 | 667 | |
| | 5 | 350 | 52 | 3.8 | 417 | 727 | 10.0 × 1.0 |

It is clear from the above data that extremely large crystals of FeOOH are obtained by the process. In Example 1, after four hours of operation crystals of one micron were obtained and size increased significantly for longer times. In Example 2, crystals of 10 microns were obtained after only two hours and were over 25 microns after four hours. In Example 3, a crystal size of 10 microns was obtained after 6 hours, when the process was operated at 55° C.

Thus, it is seen that the process of the invention provides a means to obtain very large size crystals of magnetic iron oxide which have not been achievable heretofore.

The invention claimed is:

1. A process for preparing a hydrated ferric oxide of large particle size useful for conversion to magnetic iron oxide which comprises continuously adding an oxygen-containing gas to a vigorously agitated suspension of ferric oxide at a temperature between room temperature and about 75° C. and at a pH of from about 5.0 to about 8.5 while continuously adding an aqueous solution of a ferrous salt at a rate which maintains the concentration of iron ions in the solution below about 200 mgm per liter so that no new crystals of ferric oxide form and maintaining said suspension of ferric oxide while said aqueous ferrous salt solution is added for a time sufficient to form large crystals having a particle size greater than about 2.0×0.1 microns and separating said large size hydrated ferric oxide crystals from the aqueous suspension.

2. The process of claim 1 where the aqueous suspension is continuously withdrawn and the large size crystals separated.

3. The process of claim 2 where the separated hydrated ferric oxide crystals are reduced with hydrogen at about 350° C. and reoxidized in air at about 150° C. to obtain large size crystals of γ-Fe₂O₃.

* * * * *